US012711856B2

(12) United States Patent
Ioli

(10) Patent No.: US 12,711,856 B2
(45) **Date of Patent: *Aug. 18, 2026**

(54) AUTOMATED HIGHWAY SYSTEM (AHS)

(71) Applicant: EDI LICENSING LLC, Marshall, TX (US)

(72) Inventor: Edward D. Ioli, Los Angeles, CA (US)

(73) Assignee: EDI LICENSING LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/352,637

(22) Filed: Oct. 8, 2025

(65) Prior Publication Data

US 2026/0038363 A1 Feb. 5, 2026

Related U.S. Application Data

(63) Continuation of application No. 17/548,798, filed on Dec. 13, 2021, now Pat. No. 12,451,002, which is a continuation of application No. 17/062,961, filed on Oct. 5, 2020, now Pat. No. 11,200,796, which is a continuation of application No. 16/416,959, filed on May 20, 2019, now Pat. No. 10,796,566, which is a continuation of application No. 16/036,025, filed on (Continued)

(51) Int. Cl.

| | |
|---|---|
| ***G08G 1/01*** | (2006.01) |
| ***G08G 1/005*** | (2006.01) |
| ***G08G 1/09*** | (2006.01) |
| ***G08G 1/095*** | (2006.01) |
| ***G08G 1/0967*** | (2006.01) |
| ***H04L 67/12*** | (2022.01) |
| ***H04W 4/44*** | (2018.01) |

(52) U.S. Cl.

CPC ............ *G08G 1/012* (2013.01); *G08G 1/005* (2013.01); *G08G 1/0116* (2013.01); *G08G 1/0125* (2013.01); *G08G 1/0145* (2013.01); *G08G 1/091* (2013.01); *G08G 1/096725* (2013.01); *G08G 1/096741* (2013.01); *G08G 1/096775* (2013.01); *H04W 4/44* (2018.02); *G08G 1/095* (2013.01); *G08G 1/0967* (2013.01); *H04L 67/12* (2013.01)

(58) Field of Classification Search

CPC ...... G08G 1/012; G08G 1/005; G08G 1/0116; G08G 1/0125; G08G 1/0145; G08G 1/091; G08G 1/096725; G08G 1/096741; G08G 1/096775; G08G 1/095; G08G 1/0967; G08G 1/0112; G08G 1/052; G08G 1/09675; G08G 1/096783; H04W 4/44; H04W 4/029; H04W 4/90; H04L 67/12

See application file for complete search history.

(56) References Cited

U.S. PATENT DOCUMENTS 8,044,776 B2 10/2011 Schofield et al.
8,494,759 B2 * 7/2013 Hada ................ G08G 1/096741 701/119

(Continued)

FOREIGN PATENT DOCUMENTS

CN 1261183 A * 7/2000

*Primary Examiner* — Peter D Nolan
*Assistant Examiner* — Demetra R Smith-Stewart
(74) *Attorney, Agent, or Firm* — Jackson Walker LLP; Christopher J. Rourk

(57) ABSTRACT

A system and method for controlling vehicles and for providing assistance to operated vehicles is discussed and described herein.

20 Claims, 4 Drawing Sheets

Related U.S. Application Data

Jul. 16, 2018, now Pat. No. 10,297,146, which is a continuation of application No. 15/261,091, filed on Sep. 9, 2016, now Pat. No. 10,026,310, which is a continuation-in-part of application No. 15/091,474, filed on Apr. 5, 2016, now Pat. No. 9,786,163.

(60) Provisional application No. 62/272,010, filed on Dec. 28, 2015, provisional application No. 62/252,261, filed on Nov. 6, 2015.

(56) References Cited

U.S. PATENT DOCUMENTS

| | | | | |
|---|---|---|---|---|
| 8,514,825 | B1 | 8/2013 | Addepalli et al. | |
| 8,630,795 | B2 | 1/2014 | Breed et al. | |
| 8,892,271 | B2 | 11/2014 | Breed | |
| 8,965,677 | B2 | 2/2015 | Breed et al. | |
| 9,103,671 | B1 | 8/2015 | Breed et al. | |
| 9,176,924 | B2 | 11/2015 | Ricci | |
| 9,796,383 | B2 | 10/2017 | Fairgrieve et al. | |
| 10,297,146 | B2 | 5/2019 | Ioli | |
| 2007/0299595 | A1* | 12/2007 | Boldin | G08G 1/0104<br>701/117 |
| 2019/0340921 | A1* | 11/2019 | Ran | G08G 1/0145 |
| 2024/0255291 | A1 | 8/2024 | Shashua et al. | |

* cited by examiner

AUTOMATED HIGHWAY SYSTEM (AHS)

RELATED APPLICATIONS

The present application is a continuation of U.S. patent application Ser. No. 17/548,798, filed Dec. 13, 2021, which is a continuation of U.S. patent application Ser. No. 17/062,961, filed Oct. 5, 2020, issued as U.S. Pat. No. 11,200,796 on Dec. 14, 2021, which is a continuation of U.S. patent application Ser. No. 16/416,959, filed May 20, 2019, issued as U.S. U.S. Pat. No. 10,796,566 on Oct. 6, 2020, which is a continuation of U.S. patent application Ser. No. 16/036,025, filed Jul. 16, 2018, issued as U.S. Pat. No. 10,297,146 on May 21, 2019, which is a continuation of U.S. patent application Ser. No. 15/261,091, filed Sep. 9, 2016, issued as U.S. Pat. No. 10,026,310 on Jul. 17, 2018, which is a continuation-in-part of U.S. patent application Ser. No. 15/091,474, filed Apr. 5, 2016, issued as U.S. Pat. No. 9,786,163 on Oct. 10, 2017, which claims priority to and benefit of U.S. Provisional Application No. 62/252,261, filed Nov. 6, 2015, and U.S. Provisional Application No. 62/272,010, filed Dec. 28, 2015, which are hereby incorporated by reference for all purposes as if set forth herein in its entirety.

TECHNICAL FIELD

The present disclosure relates generally to automotive controls, and more specifically to an automated highway system for controlling and assisting vehicle operations.

BACKGROUND OF THE INVENTION

Until recently, control of vehicle operations was typically manual.

SUMMARY OF THE INVENTION

A system is disclosed for controlling and providing control assistance for vehicles.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1:
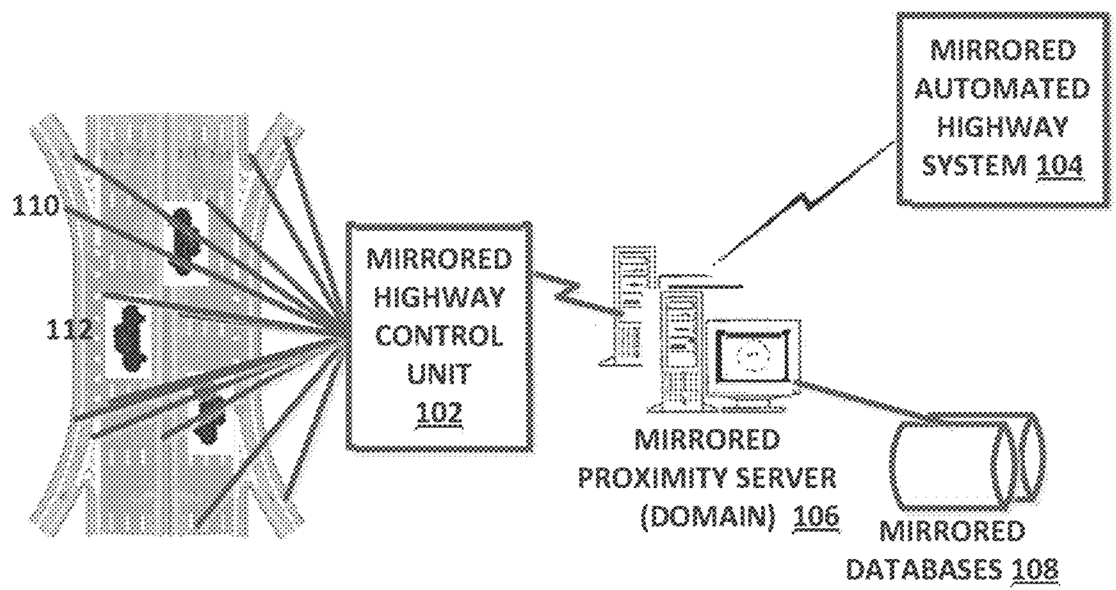
FIG. 1 is a diagram of a system 100 for providing highway automation, in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, the term Automated Highway System (AHS) and Ioliroad are interchangeable.

As used herein, the terms "vehicle-to-vehicle", "vehicle-to-infrastructure", "infrastructure-to-vehicle", "infrastructure-to-infrastructure" and "VCU-to-VCU", "VCU-to-HCU", "HCU-to" VCU", HCU-to-HCU", respectively, are interchangeable.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, touch screens, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), wireless communication, other suitable connections, or a suitable combination of such connections.

a. Design

1. Database Definitions

Note: For the purposes of this document, any reference to the term "highway" or "highways" (in both cases the first letter being lower case except at the beginning of a sentence) means any public or private way, street, road, highway, turnpike, freeway, throughway, autobahn, auto-route, rural route or any term used as a high speed public road (Private, Interstate, Toll road or otherwise) on which motorized vehicles travel including automobiles, motorcycles, buses, vans, RVs, trucks, etc., and, any public or private street, road (public, private, urban, rural or otherwise), avenue, lane, byway or any term used as a low speed public road on which motorized and non-motorized vehicles travel including automobiles, motorcycles, buses, vans, RVs, trucks, mopeds, bicycles, tricycles, etc.

a. Databases-Contained (Stored) in the Automated Highway System's (AHS) Proximity Servers (PS):

1. ACD-Accident Database: Real-time data collected from the Automated Highway System (AHS) describing accidents that occur on highways. Information collected is variable and relies on automated capture of data from sensors in the Automated Highway System's (AHS) Highway Control Unit (HCU) and Vehicle Control Unit (VCU) as well as human input at the time of the accident. Human input can be in the form of, but is not limited to, audio or video input captured from inside the vehicle through the Vehicle Control Unit (VCU) when the accident occurs. From a real-time standpoint, any indication of injury initiates notification to Emergency Medical Services (EMS). The Accident Database (ACD) is resident in each Proximity Server (PS) related to its domain (jurisdiction) in the AHS.

2. AVD-Active Vehicle Database: Real-time data collected in a Proximity Server (PS) for every vehicle that operates on a AHS highway, as described in this design document. There are an unlimited number of Proximity Servers (PS) in the AHS network, each having its own Active Vehicle Database (AVD) (logically). Each Proximity Server (PS) is responsible for a finite number of Highway Control Units (HCU) s, which are responsible for tracking a vehicle's progress on a highway. Each Proximity Server (PS) is itself a Proximity Server Domain (PSD), being stand-alone or part of a group of Proximity Servers (PS) housed in a Traffic Control Center (TCC), that communicates with a finite number of Highway Control Units (HCU) in its domain. As a vehicle traverses a highway and passes from one Proximity Server (PS) to the next Proximity Servers (PS), in line and in the direction it is heading, the vehicle information contained in the Active Vehicle Database (AVD) is passed from the previous Proximity Server (PS) to the next Proximity Servers' (PS)'s Active Vehicle Database (AVD) and is purged from the sending Proximity Server (PS). Upon a vehicle's departure from a highway controlled by the AHS, the data from the last Proximity Server (PS) the vehicle occupied is archived, then purged from the last Proximity Server's (PS) AVD (physically). For each Active Vehicle (AV) that enters a highway controlled by the AHS, the data captured (for trip information purposes) from each vehicle's Vehicle Control Unit (VCU) and each Highway Control Unit (HCU) the vehicle passes in the AHS is stored in the associated Proximity Server's (PS) AVD and includes:

a. AVI-Active Vehicle Information: All information described in Vehicle ID (VID);

b. CVBL-Commercial Vehicle Bill of Lading: Information pertaining to a commercial vehicle's cargo.

c. CVFIN-Commercial Vehicle Federal ID Number: Nomenclature assigned to each commercial vehicle by Governmental, Province or State Department Of Transportation.

d. UMV-Unknown Motorized Vehicles: Vehicles operating on a highway with engines running but not having a Vehicle Control Unit (VCU) (OEM or after-market) on-board are defined as Unknown Motorized Vehicles (UMV).

e. UNMV-Unknown Non-Motorized Vehicles: Non-motorized vehicles operating on a highway not having a Vehicle Control Unit (VCU) on-board are defined as Unknown Non-Motorized Vehicle (UNMV) (e.g. bicycles, tricycles, etc.).

f. For all of the Above Type Vehicles, the Following Information is Captured, where Appropriate:

1. CT-Checkpoint Timestamps: Timestamp recordings for each vehicle taken at highway entrance time and at interval Checkpoints (CP) every ½ mile (0.805 kilometers);
2. TDE-Time and Date of Vehicle Egress: Time and date stamp of vehicle's departure from highway.
3. TDI-Time and Date of Vehicle Ingress: Time and date stamp of vehicle's entrance to highway.
4. TD-Time Delay: Calculated at each checkpoint (CP) and indicating any abnormal delays. Any abnormal delay triggers notification to authorities, (e.g. Traffic Advisory Service).
5. TRDE-Trip Destination: Obtained from vehicle's Vehicle Control Unit (VCU) upon entrance to highway, the address or geo-coded location where trip is to end. TRDE is optional.
6. TRDU-Trip Duration: Trip's length in time calculated on vehicle's TDI and TDE from highway. TRDU is optional.
7. TO-Trip Origination: The address or geo-coded location where trip started, obtained from vehicle's Vehicle Control Unit (VCU) or Global Positioning System (GPS) upon entrance to highway.
8. VS-Vehicle Speed: Vehicle speed obtained from the vehicle at specific time intervals or determined by the continuous calculation of distance divided by time between point A and point B, etc., e.g. every ½ mile (0.805 kilometers) by the Proximity Server (PS).
9. VTC-Vehicle Type Code: Obtained from vehicles' Vehicle Control Unit (VCU) upon entrance to highway, indicating the type of vehicle, i.e.: passenger vehicle, truck, motorcycle, etc.:

a. PV-Passenger Vehicle: Any private 4 wheel Passenger car, van, SUV, pick-up truck, or truck.

b. PPVE-Public Passenger Vehicle: Any public vehicle carrying passengers on a fee or non-fee basis including large and small busses, limousines, uber or lyft vehicles, taxicabs, etc.

c. CV-Commercial Vehicle: Any commercial truck with anywhere from four to eighteen wheels.

d. CY-Cycle: Any two wheel motorized cycle containing authorized license plates.

e. BI-Bicycle: Any two or three wheel non-motorized vehicle

Note: Once a vehicle leaves the highway controlled by the AHS or "engine stop" occurs, its data, captured by the AHS in the AVD, is moved to the Archived Database (ARD). For instances of engine stop occurrences on high speed highways (other than at rest stops, gas stations, etc.) such as turnpikes, freeways, etc. where the only way to depart this type of highway is via an exit, analysis is performed as to the length of time engine stop lasts. If duration is longer than a period of time pre-determined by the jurisdictional authority in which the vehicle is operating, appropriate action (notification to proper authorities) is taken.

3. ARD-Archived Database: For each vehicle's sojourn in the AHS, each vehicle's Active Vehicle Database (AVD) information is stored off-line in a non-central Proximity Server (PS) which is kept for a finite period of time determined by the jurisdictional authority and then purged.

4. APD-Active Permanent Database: Continuously stored data in each Proximity Server (PS) in the AHS and reflecting the Proximity Server's (PS) Jurisdictional regulations. While this database is independent of any Active Vehicles (AV) on the highway, the data contained therein is communicated, when required, to Active Vehicles (AV) on the highway. This media is used for storage of generic and vehicle specific messages and notices. Generic messages remain in the database until an authorized entity deletes or changes them. Additionally, a traffic light and stop sign inventory is maintained for all traffic lights and stop signs resident in each Proximity Server's (PS) jurisdiction in the AHS. The data included in each of these Proximity Server's (PS) APD include:

a. EMS-Emergency Medical Services: Informational and location data of Emergency Medical Services contained in each Proximity Server (PS) reflecting local and regional EMS facilities. Contact information and notification data is available for use when accidents occur.

b. FSPCMN-Federal/State/Province/City Messages and Notices: Messages and notices to vehicles, by jurisdiction, which are modifiable by the governing jurisdiction and containing the following:

1. BNTAV-Broadcast Notices to All Vehicles: Notices to all Active Vehicles (AV) on highway by the AHS.

2. BNTA-Broadcast Notices to Automobiles: Notices to all Active Vehicles (AV-PV) on the highway by AHS.

3. BNTCPCV-Broadcast Notices to Commercial Passenger Carrier Vehicles: Notices to all commercial (passenger carrying) Active Vehicles (AV-PPVE) on the highway by the AHS.

4. BNTCT-Broadcast Notices to Commercial Vehicles (Trucks): Notices to all Commercial (cargo carrying) Active Vehicles (AV-CV) on highway by the AHS.

5. NTSV-Notices to Specific Vehicle: Non-stored, pass-through notices issued by the AHS emanating from a legal entity (i.e., Governmental, local police, state police, etc., with jurisdictional authority) to a specific Active Vehicle (AV) identified by its Vehicle Identification Number (VIN).

c. FSPCRC-Federal/State/Province/City Regulatory Codes, by Jurisdiction, which are Modifiable by the Governing Jurisdiction and Containing the Following:

1. CTSL-Commercial Truck Speed Limit: Minimum and speed limits for trucks and other large commercial maximum vehicles.

2. HOVC-High Occupancy Vehicle Count: Occupancy count. Minimum number of passengers allowed in vehicle to have permission to occupy HOVL by AHS based on Jurisdictional regulations.

3. FPEP-FAST PASS/EZ Pass: Lanes used by vehicles containing pre-paid passes, e.g., Fast Pass/EZPass.

4. PVSL-Passenger Vehicle Speed Limits: Minimum and maximum speed limits for (passenger) vehicles (automobiles, small trucks, etc.

5. TR—Traffic Rules-All rules governing traffic flow or vehicle operation, by jurisdiction, while an Active Vehicle (AV) is operating in the AHS are communicated to the Vehicle Control Unit (VCU) of the Active Vehicle (AV) when conditions dictate, e.g. When two or more vehicles enter a four-way intersection, with stop signs at each of the four intersects, at the same time, vehicles will yield to the vehicle on the right, etc.

d. TLD—Traffic Light Data (Implied herein is that all inventoried traffic lights in the AHS will have stored data and communication capability): Data related to all physical traffic lights and their locations (cross streets and/or GPS geographic coordinates) for each traffic light within each Proximity Server (PS) jurisdiction. Also stored in the Proximity Server (PS) is the unique addressable traffic light ID number for each traffic light which is used for communication between each traffic light, Highway Control Unit (HCU) and Active Vehicle's (AV) Vehicle Control Unit (VCU) in the AHS. Each traffic light has the following information stored:

1. Physical location (by cross streets and/or GPS geographical coordinates)
2. For each traffic light, a unique addressable ID number
3. For each traffic light inventoried in each Proximity Server (PS) in the AHS, Real time traffic light status data is maintained with regards to stop, caution or go status (Red, Yellow or Green). In addition to red/yellow/green traffic lights, traffic lights also include blinking yellow caution lights (meaning proceed with caution), flashing red lights meaning stop then proceed with caution, etc. The real time status of traffic lights is used to communicate with a vehicles' Vehicle Control Unit (VCU) that is in Control Mode (CNM) as to whether the vehicle may pass through an intersection with a traffic light (green) or stop (red) until the light turns green. As backup, if a vehicle is equipped with appropriate technology, a camera from a vehicle may read the color status of a traffic light being approached by the vehicle and react accordingly. If a vehicle is not in Control Mode (CNM) but rather in Communication Mode (CMM) or Monitor Mode (MM), verbal communication with the Vehicle Operator (VO) occurs.

e. SSD-Stop Sign Data (Implied herein is that all inventoried stop signs in the AHS will have its own Highway Control Unit (HCU) and will have stored data and communication capability): Data related to all physical stop signs and their locations (cross streets and/or GPS geographic coordinates) for each stop sign within each Proximity Server's (PS) jurisdiction. Also stored is a unique addressable stop sign ID number used for communication between Highway Control Unit (HCU) and Vehicle Control Unit (VCU) for all Active Vehicles (AV) in the AHS. Each stop sign has the following information stored:

1. Physical location (cross streets with north/south/east/west indicator and/or GPS geographic coordinates
2. Stop sign unique addressable stop sign ID number f. RSD-Road Sign Data (Implied herein is that all inventoried road signs in the AHS will have its own Highway Control Unit (HCU) and will have stored data and communication capability): Data related to all physical traffic signs such as stop, winding road ahead, T intersection, road work ahead, slow, no left turn, deer crossing, no U turn, road ahead curves to right and left, etc. and their locations (cross streets and/or GPS geographic coordinates) for each road sign within each Proximity Server's (PS) jurisdiction. Also stored is a unique addressable road sign ID number used for communication between Highway Control Unit (HCU) and Vehicle Control Unit (VCU) for all Active Vehicle (AV) in the AHS. Each road sign has the following information stored:

1. Physical location (cross streets with north/south/east/west indicator and/or GPS geographic coordinates
2. Road sign unique addressable road sign ID number g. PHMD-Painted Highway Markings Data (Implied herein is that all inventoried painted highway markings in the AHS will have its own Highway Control Unit (HCU) and will have stored data and communication capability): Data related to all physical painted highway markings such as left turn only (or symbols (arrows) indicating left turn), stop, yield, bump, or other symbols or text painted on the highway, etc. and their locations (cross streets and/or GPS geographic coordinates) for each Painted Highway Marking (PHM) within each Proximity Server's Jurisdiction. Also stored in the HCU is a unique addressable Painted Highway Marking ID number used for communication between Highway Control Unit (HCU) and Vehicle Control Unit (VCU) for all Active Vehicles (AV) in the AHS. Each Painted Highway Marking has the following information stored:

1. Physical location (cross streets with north/south/east/west indicator and/or GPS geographic coordinates
2. Painted Highway Marking unique addressable Painted Highway Marking ID number Note: For all Traffic Lights, Stop Signs, Road Signs and Painted Highway Markings in the AHS, power supply to these lights, signs and markings is accomplished via electrical wiring, late technology batteries and/or solar panels, whichever is appropriate and available.

Additionally, communication between Proximity Servers and their respective traffic lights, stop signs, road signs and painted highway markings is on a continuous basis and is used for testing the existence (pinging) of these devices by their response. If a response fails, appropriate Jurisdictional authorities are notified so that repairs can be performed on an emergency basis.

5. AUD-Audit Database: Trip data on all vehicles that enter a highway controlled by AHS is stored in linear form producing an audit of what transpired on the highway. The AUD is to be archived off to the Archive Database along with relevant data from the AVD and APD. Purging of this audit data is at the discretion of the jurisdictional authority.

6. VVD-Vehicle's Vehicle Control Unit (VCU) Database contains the following:

a. VID-Vehicle ID: Stored in vehicle's on-board Vehicle Control Unit (VCU) and obtained by the AHS from vehicle's Vehicle Control Unit (VCU) upon entrance to highway and containing the following:

1. DOI-Disability Operator Indicator: A secured indicator (flag) to indicate that the Vehicle Operator (VO) is a disabled Vehicle Operator (VO).

2. DO-Disability Operator: If the DOI is true, information indicating what type of disability the Vehicle Operator (VO) has.

3. EVI-Emergency Vehicle Indicator: A secured indicator (flag) to indicate that a vehicle is an emergency vehicle such as Police, Fire, Medical or other vehicle that is authorized as such.

4. EV-Emergency Vehicle: If the EVI is true, information describing what type of emergency vehicle (e.g. Ambulance, Police, Fire, etc).

5. EVAI-Emergency Vehicle Active Indicator: Flag that indicates that the EV is operating in an emergency situation with sirens and flashing lights active.

6. HMI-Hazardous Material Indicator: A secured indicator (flag) to indicate the vehicle, whether commercial or private, is carrying hazardous material.

7. HM-Hazardous Material: If HMI is true, information indicating what type of hazardous material is being carried by the vehicle.

8. HME-Hazardous Material Effects: If HMI is true, information on the effects on human or animal life and the environment this hazardous material would have if either was exposed to this material.

9. HMR-Hazardous Material Remedy: If HMI is true, information indicating what type of remedy or clean-up material is to be used in a clean-up situation (environmental) and any decontamination remedies, for human or animal remedy use, should a spill of this material occur.

10. POC-Passenger Occupancy Count: Number of passengers in vehicle at "engine start" time including Vehicle Operator (VO). Defaulted to 1, Vehicle Operator (VO), unless modified at "engine start" time or other time deemed necessary by the Vehicle Operator (VO). (Note: Automated vehicles may have the ability to count the number of passengers at engine start time automatically (through sensors) and make available to the Vehicle Control Unit (VCU). If vehicle is autonomous vehicle with ability to operate without any passengers and/or Vehicle Operator (VO), count is set to zero.

11. TTIC-Towed Trailer Indicator Code: Defaulted to "none" unless modified at "engine start" time. Indicates vehicle has a towed trailer.

12. TTL-Towed Trailer Length: If TTIC is true, Length of towed trailer.

13. TRDE-Trip Destination: The address of the vehicle's destination at engine start time (option) and stored in vehicle's on-board Vehicle Control Unit (VCU). Contains Street, City, County, State, Country and Zip/Postal Code of trip destination. TRDE is modifiable at any time during trip by Vehicle Operator (VO), safely and at-will. If vehicle stops during trip with engine off and if vehicle starts engine within 5 minutes of engine stop time, AHS assumes trip destination is the same, otherwise AHS asks if the trip destination should remain the same or be reset. In cases where there is no destination indicated, meaning the Vehicle Operator (VO) is pleasure driving, control of the vehicle can be manual or in Control Mode (CNM) but with audio commands for trip direction and operation.

14. TO-Trip Origination: The address of the vehicle's location at "engine start" time (optional) is obtained manually or by GPS and stored in vehicle's on-board Vehicle Control Unit (VCU). Trip Origination (TO) contains Street, City, County, State, Country and Zip/Postal Code of trip origination.

15. VIN-Vehicle Identification Number: Unique, non-modifiable nomenclature identifying vehicle which was assigned to vehicle by its manufacturer.

16. VD-Vehicle Dimensions: Non-modifiable length, height and width of vehicle assigned by manufacturer when manufactured.

17. VLPN-Vehicle license plate number: Initially stored by authorized entity (dependent on State/Country regulations/procedures) and non-modifiable thereafter, unless modified by authorized entity (dependent on state/country regulations/procedures).

18. VON-Vehicle Owner: Person's name (company's name in the case of commercial vehicles) who owns or leases the vehicle.

19. VONFP-Vehicle Owner's Finger(s) print(s): If the technology is available by vehicle manufacturer or Telematics, the finger(s) print(s) of the VON is/are captured, when the VON chooses to do so, by pressing the start button in the vehicle and used when starting the vehicle to identify the Vehicle Operator (VO). The purpose of capturing the finger (s) print(s) is so that the VON would not be required to scan their driver's license at "engine start" time.

20. VOPFP-Vehicle Operator's Finger(s) print(s): If the technology is available by the vehicle manufacturer or Telematics, at the discretion of the VON, the finger(s) print(s) of persons authorized to operate the vehicle are captured and used when pressing the start button to identify the Vehicle Operator (VO). The purpose of capturing the finger(s) print(s) is so that the Vehicle Operator (VO) would not be required to scan their driver's license at "engine start" time.

21. VONDLN-Vehicle Owner's Driver's License Number: Modifiable only by authorized entity at time of purchase or transfer of ownership.

22. VO-Vehicle Operator: Defaulted to Vehicle Owner's (VON) name for privately owned vehicles unless modified at engine start time with Vehicle Operator's name by the Vehicle Operator operating the vehicle. For commercial vehicles, initiated at engine start time by Vehicle Operator or authorized entity. If the technology from the vehicle manufacturer or from a Telematics technology supplier is available, the name could be captured from a driver's license scanning device. Additionally, if the technology is available, the finger(s) print(s) of the Vehicle Operator (VO) would be captured when pressing the start button in the vehicle. If there is no match of the finger(s) print(s) in the Vehicle's VCU Database (VVD), the Vehicle Operator (VO) is requested to scan their driver's license. Optionally, they may verbally announce their name.

23. VOPDLN-Vehicle Operator's Driver's License Number: Defaulted to Vehicle Owner's driver's license number for private vehicles unless modified at "engine start" time with Vehicle Operator's driver's license number by the Vehicle Operator. VOPDLN is reset to default when engine is turned off. For commercial vehicles, the VOPDLN would be assigned at trip commencement engine-start time. If the Telematics technology is available, the name could be captured from a driver's license scanning device.

24. VOCPN-Vehicle Operator's Cell Phone Number: Optionally identified by operator at "engine-start" time and modifiable at-will.

25. VONCPN-Vehicle Owner's Cell Phone Number: Identified by the owner at set-up time and modifiable at-will.

26. VTC-Vehicle Type Code: Indicates type of vehicle:

a. PV-Passenger Vehicle: Any private 4 wheel Passenger car, van, SUV, pick-up truck, or truck.

b. PPVE-Public Passenger Vehicle: Any public vehicle carrying passengers on a fee or non-fee basis including large and small busses, limousines, Uber, Lyft, etc. or taxicabs.

c. CV-Commercial Vehicle: Any commercial truck with anywhere from four to eighteen wheels or more.

d. CY-Cycle: Any two or three wheeled motorized cycle containing authorized license plates.

e. BI-Bicycle: Any two or three wheeled non-motorized cycle. (Note: This indicator assumes the technology is available in bicycles to contain a Vehicle Control Unit (VCU) and is powered by peddling the bicycle.

2. Processes:

a. AV-Active Vehicle: Any vehicle actively operating on an AHS highway.

b. AVCIT-Active Vehicle Count in Traffic: Each Highway Control Unit (HCU) in the AHS, synchronized laterally across a highway and on a continuous basis, captures a real-time count of vehicles within predetermined geographical parameters (e.g., every ½ mile (0.805 kilometers)) and is measured with regard to vehicle count. If any abnormal spikes occur in the vehicle count (non-gradual increases), an alert is issued to the Traffic Control Center (TCC)) that a potential problem exists. Appropriate action by the Traffic Control Center (TCC) then takes place, if needed.

c. AHS-Automated Highway System (AKA: IoliRoad): Includes all definitions, processes and functionality described in the AHS design document.

d. AUV-Autonomous Vehicle: Vehicles with state-of-the-art automated components to operate a driverless vehicle. AHS will work with autonomous vehicles with or without a steering wheel, brakes and/or gas pedal.

e. AVC-Automated Vehicle Control: The process of controlling a vehicle's movement on a highway through bi-directional Communication commands between a Highway Control Unit (HCU) and the Vehicle Control Unit (VCU) within the AHS for all Active Vehicles (AV) in Control Mode (CNM). Vehicle control (either manufacturer or third party telematics supplied) includes:

1. Breaking;
2. Forward and Reverse movement;
2. Acceleration and deceleration;
3. Steering;
4. Turn Signaling; and
5. Vehicle's Horn Activation Open architecture with all vehicle manufacturers and/or after-market on-board (Telematics) automated systems (e.g. Mobileye, lidar technology, etc.) is inherent in the system including sensors and video (front, rear & sides, etc). In cases of objects (foreign, inanimate or otherwise) in an AHS highway or road such as human beings, large rocks, vehicles with engines turned off, etc. will be handled appropriately with sensors in autonomous vehicles that detect same.

f. CP-Checkpoint: Data snapshots taken at critical points (e.g., intervals of every ½ mile (0.805 kilometers), are stored in the Active Vehicle Database (AVD). The data snapshot contains points-in-time information on each vehicle that passes each checkpoint and is stored in the associated Proximity Server's (PS)'s AVD and passed on to the next Proximity Server (PS) in line.

g. CCS-Coordinate Checking Signals: When a vehicle is detected leaving a Highway Control Unit (HCU) sphere, a coordinate checkpoint is recorded. When the immediately following Highway Control Unit (HCU) detects the same vehicle entering its sphere, a coordinate checkpoint is recorded. These two coordinate checkpoints are cross-haired and the e lateral position of the vehicle in the lane is determined. This process continues indefinitely until the vehicle exits the highway. Serious deviation from these lateral position points (without crossing into another lane) indicates weaving within the lane and the Vehicle Operator (VO) is so notified, when in Monitor Mode (MM). When in Control Mode (CNM), Coordinate Checking Signals (CCS) is the method used for the AHS to control the vehicle's Automated Vehicle Control (AVC) (i.e. breaking, acceleration, steering, turn-signaling and horn activation). When in Control Mode (CNM), AHS determines when it is safe to change lanes, accelerate, decelerate, etc. When in Control Mode (CNM), if the Vehicle Operator (VO) deems it necessary, the Vehicle Operator (VO) may manually override Automated Vehicle Control (AVC). This manual override occurs when the Vehicle Operator (VO) touches the steering wheel or applying pressure to the break or accelerator, or, verbal orders, if the technology is available. Conversely, if the Vehicle Operator (VO) wishes to activate Control Mode (CNM) in the Automated Vehicle Control (AVC), they would do so by pressing a button on the steering wheel or dashboard or by audio command, whichever is available.

HOV-High Occupancy Vehicle: Vehicles containing 2, 3 or more passengers, depending on state/country regulations. When a vehicle enters an HOV lane the Passenger Occupancy Count (POC) is compared to the High Occupancy Vehicle Count (HOVC) for compliance. If vehicle is determined to be illegally in the HOV lane, appropriate action is taken, e.g. issuance of a traffic ticket. If vehicle is under Control Mode (CNM), vehicle will not enter HOV lane if correct number of passengers is present in vehicle.

h. HOVL-High Occupancy Vehicle Lane: A highway lane in which HOVs are allowed to occupy on a permanent or timed basis, depending on state/country regulations.

i. HCU-Highway Control Unit: Container unit of sturdy material that can withstand severe weather and physical exposure (e.g. Vehicles crossing over the Highway Control Unit (HCU), vehicles sliding over the Highway Control Unit (HCU) due to an accident, extreme inclement weather conditions, etc.). Highway Control Units (HCU) s contain the latest technology (all components mirrored) imbedded microprocessors, hard disc storage, USB 3.0 (or latest version), FireWire, WIFI, RFID or the latest technology available for data transmission and wireless communication with hardware utilizing technology such as Bluetooth, HiperLAN, WAP, HomeRF, SWAP, WLAN, 802.11a, 802.11b or other latest communication technology deemed necessary. Each Highway Control Unit (HCU) is modular and individually addressable (firmware or software) by other Highway Control Units (HCU) s and all Proximity Servers (PS) in the AHS network. Each Highway Control Unit (HCU) in the AHS network is connected on either side (including linearly across lanes) by a Highway Control Unit Connector (HCUC). Highway Control Units (HCU) s and Highway Control Unit Connectors (HCUC) s are placed at certain intervals, whose placement are determined by the technology available at the time of construction, by a Highway Control Unit Connector (HCUC) which consists of 1) copper electrical wiring for electrical power transmission (or independent solar panels where feasible) devices to produce power, and 2) fiber optic cable for communication between other Highway Control Units (HCU) s and Proximity Servers in the AHS network and/or wireless communications capability containing the latest wireless technology. Each Highway Control Unit (HCU) contains storage space for:

1. Highway Control Unit (HCU) Unique Address;
2. Country Code;
3. State/Province Code;
4. Region Code (country specific);
5. Highway Code;
6. Exit Code (exit name and exit number), and
7. Geographic Coordinate Code (used with GPS, where appropriate);
8. Traffic direction indicator
9. Any other pertinent information and software related to the Highway Control Unit's (HCU)'s operation
10. Street Code;
11. Cross Street Intersection Code;
12. Traffic Light Code (*);
13. Stop Sign Code;
14. Road Sign Code;
15. Painted Highway Marking Code; and
16. House/Building Location Code

* The Traffic Light Code is used for highways in which traffic lights (signals) are used to control traffic.

j. HCUC-Highway Control Unit Connector: Each Highway Control Unit (HCU) in the AHS network is connected on either side of the Highway Control Unit (HCU) by 1) copper electrical wire for electrical power supply (or independent solar panels where feasible), and, 2) fiber optic cable or wireless WIFI, or other state of the art wireless technology, for communication between Highway Control Units (HCU) s and Proximity Servers (PS) in the AHS network. A segment of the fiber optic network, if used, is used for homogeneous communication within the AHS. The remaining fiber optic capacity (bandwidth) can also be used for commercial purposes. AHS takes priority over all other use of the fiber optic network.

k. HVC-Highway/Vehicle Communication: Short-range wireless communication between a Highway Control Unit (HCU) and a Vehicle Control Unit (VCU) through RF or other appropriate technology (e.g. bluetooth, WIFI, Hiper LAN, HomeRF, 802.11a, 802.11b or other state of the art wireless communication technology deemed necessary).

l. Modes: Modes (or states) in which a vehicle is in within the AHS:

1. CMM-Communication Mode: Mode in which Highway Control Unit (HCU) communicates with Vehicle Operator (VO) through vehicle's Vehicle Control Unit (VCU) and the vehicle's standard radio speakers, or, if radio is not present, through Vehicle Control Unit's (VCU)'s speakers. In either case, when in Communication Mode (CMM), active radio output (radio playing) is overridden by the AHS.

2. CNM-Control Mode: Mode in which Highway Control Unit (HCU) communicates and controls vehicle movement through vehicle's Vehicle Control Unit (VCU) as defined in Automated Vehicle Control (AVC). The Vehicle Operator has the option to disengage Control Mode (CNM) function at-will by either touching the steering wheel or stepping on the brake or gas pedal (if this technology is available). Manually moving the Turn Signal does not disengage Control Mode (CNM), but does communicate to the Highway Control Unit (HCU) the desire to switch lanes when feasible. Conversely, if the Vehicle Operator (VO) wishes to activate Control Mode (CNM) in the Automated Vehicle Control (AVC), they would do so by depressing a button on the steering wheel or dashboard or by audio command, whichever is available.

3. MM-Monitor Mode: Mode in which Highway Control Unit (HCU) monitors (observes) a vehicle through vehicle's Vehicle Control Unit (VCU), if available. If a Vehicle Control Unit (VCU) is not available, then through strategically placed video or radar detection technology in the AHS for Unknown Motorized Vehicles (UMV) or Unknown Non-Motorized Vehicles (UNMV).

m. PS-Proximity Server: Multiple (all components mirrored) microprocessor computer server systems residing in the AHS network that host the Accident Database (ACD), the Active Vehicle Database (AVD), the Archived Database (ARD), the Active Permanent Database (APD), the Audit Database (AUD) and the Vehicle's VCU Database (VVD). These Proximity Server (PS) s are housed in Traffic Control Centers (TCC) and have the ability to communicate with any Highway Control Unit (HCU) or Vehicle Control Unit (VCU) in its Proximity Server Domain and/or with other Proximity Servers (PS) in the AHS network if required. Each Traffic Control Center TCC is strategically placed in the AHS network and reflects homogeneity as it relates to City, County, Province, State, Federal or other legal jurisdictional boundary protocols.

n. PSD-Proximity Server Domain: A finite grouping of Proximity Servers (PS) housed in a Traffic Control Center TCC and segregated by jurisdictional boundaries as described in Proximity Server (PS). Highway Control Units (HCU) are part of a Proximity Server's Domain.

o. PPV—Prepaid Vehicles: Vehicles containing passes such as Fast Pass, EZ Pass, etc. to be used in prepaid pass lanes on a highway.

p. PPVL—Prepaid vehicle lanes: Lanes on a highway in which Prepaid Vehicles (PPV) s may travel.

q. TAA—Traffic Abnormal Activity: Traffic activity on a highway that is calculated from Highway Control Unit (HCU) and Vehicle Control Unit (VCU) real-time input to be abnormal through an algorithm used in the AHS. Algorithmic calculation takes place in the Proximity Server (PS) and can handle, simultaneously, any number occurrences of abnormal activity situations.

r. TCC—Traffic Control Center: Physical buildings or housed units segregated by jurisdictional homogeneity containing AHS Proximity Server(s) (PS) pertinent to the jurisdictional domain.

s. TD—Traffic Direction: Under normal circumstances traffic direction is either on the right or left side of a highway on two way highways/streets and in one direction on one way highways/streets depending on Country specific jurisdictional protocols. Each direction contains one or more lanes in which traffic is moving in the same direction. When situations arise whereby the direction of lane(s) has/have to be altered (re-directed) due to issues such as construction, inclement weather, accidents, etc., AHS has the ability to accommodate such temporary alterations by programmable means within the respective Proximity Server (PS). This alteration is accomplished manually by authorized personnel. Notification to all vehicles operating on the highway is be accomplished via AHS' communication facility accommodating such alteration. This same concept is applied to road closure situations with regard to alternate routing.

t. UMV-Unknown Motorized Vehicles: Vehicles operating on a highway or street with engines running but not having a Vehicle Control Unit (VCU) (OEM or after-market) on board are defined as Unknown Motorized Vehicles (UMV).

u. UNMV-Unknown Non-Motorized Vehicles: Non-motorized vehicles operating on a highway not having a Vehicle Control Unit (VCU) (OEM or after-market) onboard are defined as Unknown Non-Motorized Vehicles (UNMV). To the extent possible, these UMVs and UNMVs are detected, monitored and communicated with by the AHS with either of the following methods:

1. Detect for Both UMVs and UNMVs:

a) A radar detection system contained in each Highway Control Unit (HCU) to detect a UMV and UNMV.

b) All UMVs with engines running emit some kind of signal (electrical, RF, Infrared, etc.) in which the Highway Control Unit (HCU) can pick up within a defined proximity of the Highway Control Unit (HCU).

c) A motion detection technology similar to the technology in home security systems.

d) New sensor technology contained within the vehicle or highway that is made available commercially by private industry or the local or governmental entities (e.g. Sweet spot sensors (re-engineered for commercial use) in the antimissile defense systems) or sensors currently used in motor vehicles, only with a greater range. Note: If the technology is available, UNMVs may contain a Vehicle Control Unit (VCU) that is powered by peddling the bicycle. In this situation, Highway Control Units can detect and monitor UNMVs on the highway and communicate same to Active Vehicles in proximity.

2. Communicate:

Provided the UMV has a standard radio on-board and is in the "on" state, the AHS communicates (sending messages and/or notices to the "now" identified vehicle) with the UMV via a broadcast message from the Highway Control Unit (HCU) to the UMVs radio across all frequencies on the vehicle's radio. The AHS communicates with other vehicles present on the highway, within a predefined range that do contain a Vehicle Control Unit (VCU), about the UMVs and UNMVs presence, when required.

3. Monitor:

If state-of-the-art video technology is available and contained in Active Vehicles (AV) and/or strategically placed highway locations, after the UMV or UNMV is detected, as described above, this video technology would capture the vehicles license plate number, if present, tag the license plate number to the UMV (for tracking purposes), then track the vehicle during its sojourn on the highway.

v. VCU-Vehicle Control Unit: Control unit on-board vehicle that communicates, 2 way, with the Highway Control Unit (HCU) for purposes of controlling the vehicle's movement. The Vehicle Control Unit (VCU) also contains all data described in Vehicle ID (VID).

3. Functionality:

a. Highway:

1. Highways and their exits contain a network of Highway Control Units (HCUs) and Highway Control Unit Connectors (HCUC) s which are strategically spaced apart and placed at certain intervals, whose placement intervals are determined by the communication technology available at the time of construction. Additionally, highways and their exits may contain traffic lights, stop signs and/or other road signs, each having their own addressable unique ID number. Each Highway Control Unit (HCU) is modular and individually addressable (Software and/or firmware) by all other Highway Control Units (HCU) s and all Proximity Servers (PS) in the AHS network, also addressable, in the AHS network. Each Highway Control Unit (HCU) in the AHS network is connected by the Highway Control Unit Connector (HCUC) for electrical power (copper wire) or solar panel power, if feasible, and wired or wireless communications (fiber optic cable) or wireless WIFI (or other state of the art wireless communication available) with other Highway Control Units (HCU) s and Proximity Servers (PS) in the AHS network. Each Highway Control Unit (HCU) also contains wireless communications hardware that enables it to communicate with wireless communication hardware in each vehicle containing a Vehicle Control Unit (VCU) (OEM or after-market). Each Highway Control Unit (HCU) has self-contained storage (DASD) space for indicative and address information about itself including:

a. Highway Control Unit (HCU) Unique Address
b. Country Code;
c. State/Province Code;
d. Region Code (country specific);
e. Highway Code;
f. Geographic Coordinate Codes (used with GPS, if required) for each of the following:

1. Highway Exit Codes (exit names and exit numbers), and
2. Street Codes and names of cross streets;
3. Intersection codes;
4. Traffic Light Codes and names of cross streets,
5. Stop Sign Codes and names of cross streets, and
6. Road Sign Codes and names of street (or cross streets);
7. Painted Highway Markings
8. House/Building Location Code Note: The data regarding the vehicle and Vehicle Operator (VO) contained in the Vehicle's VCU Database (VVD) can be stored in the AHS in either of two ways:

1) As described above in the Highway Control Unit (HCU). If this is the chosen method, as each vehicle passes a Highway Control Unit (HCU), the data on these vehicles and their respective Vehicle Operator (VO) (updated) is passed to the next Highway Control Unit (HCU) in line and erased from the preceding Highway Control Unit (HCU). This requires cycle time and can effect performance of the system.

2) The other method of storage is to store this same information in a Proximity Server to which a particular Highway Control Unit (HCU) "belongs" within a Proximity Server's domain. As the vehicle passes from one Proximity Server to the next, the information (updated) is passed to the next Proximity Server in line until the vehicle exits the highway. This yet to be determined method of storing this information is based on performance issues that have yet to be defined. With the Highway Control Unit (HCU) method, quick communication, if needed, from the Highway Control Unit (HCU) to the Vehicle Control Unit (VCU) is available. However, this is off-set by the processing time it takes to move the information from one Highway Control Unit (HCU) to the next while the vehicle is travelling the AHS. With the Proximity Server (PS) method, the movement of information from one Highway Control Unit (HCU) to the next is eliminated. However, this elimination is valuable only to the extent that the cycle time saved is less than the Highway Control Unit (HCU) method. This is obtained by subtracting the time it takes to update the Proximity Server (PS) as each vehicle passes each Highway Control Unit (HCU) from the time saved when eliminating the Highway Control Unit (HCU) method.

2. Highway and roadway lanes are separated by various types of painted lines, the color of which is usually white or yellow. These types of painted lines include solid continuous lines, separated striped white or yellow lines, single, double or quadruple solid white or yellow lines, single or double striped white or yellow lines, solid lines adjacent to striped white or yellow lines in single set form or double set form, blocked dotted white or yellow lines, etc. Each of these types of painted line configurations indicates what can and cannot be done while a vehicle is travelling in a lane, e.g., exit only lane, vehicle may cross and pass another vehicle in a lane, no passing lane, etc.). Additionally, symbols and/or text may be written on the highway which indicate additional information regarding traffic conditions/situations, e.g. "HOV Lane" or Diamond symbol, "Keep Clear", "Right Turn Only", bike lane, RR Crossing, etc. These painted symbols/text writings and painted lines contain strategically placed Highway Control Units (HCU) within.

AHS is configured to comply with the meaning of these painted lines, symbols and text by way of the imbedded Highway Control Unit (HCU) communicating with the vehicle Vehicle Control Unit (VCU), or by way of video capability in the vehicle, both controlling the vehicle while in Control Mode (CNM) or communicating with the Vehicle Operator (VO) in Monitor Mode (MM) or Communication Mode (CMM).

3. Highway Control Units (HCU) s have the ability to communicate with each other and with the Vehicle Control Unit (VCU) on all automated (autonomous) vehicles (or non-automate (non-autonomous) vehicles containing a Vehicle Control Unit (VCU) on a real-time basis. This process enables vehicle-to-vehicle (VCU-to-VCU), vehicle-to-infrastructure (VCU-to-HCU), infrastructure-to-vehicle (HCU-to-VCU) and infrastructure-to-infrastructure (HCU-to-HCU) communication. HCU-to-HCU communication can be utilized in environments where non-automated (non-autonomous) vehicles are operating on the highway. Sensors from automated (autonomous) vehicles can detect non-automated (non-autonomous) vehicles and pass that information to other vehicles via HCU-to-HCU and HCU-to-VCU communication.

4. A checkpoint at predefined intervals and is also taken as each vehicle passes every exit ramp location or cross street on all highways.

5. A vehicle's departure from the highway on an exit ramp, "engine stop" time or departure from the AHS is recorded in the AUD, AVD and ACD.

6. Vehicle lateral movement within a highway lane is monitored and/or controlled by coordinate checking signals (CCS) received between Highway Control Units (HCU) s in a single lane. Crossing over lanes is monitored and/or controlled in a similar method. Control Mode (CNM), if enabled, controls steering, acceleration, breaking, turn signaling and horn activation on a vehicle. When a road curves, to keep the vehicle in line with the lane's Highway Control Units (HCU) s, lateral movement within a lane is controlled in this fashion. AHS checks to see if Control Mode (CNM) is enabled before giving commands to a vehicle. Coordinate checking signals between Vehicle Control Unit (VCU) and Highway Control Unit (HCU) is used to control steering of vehicle.

7. The Vehicle Control Unit (VCU) communicates with toll collection systems on toll roads, bridges and highways via the Highway Control Unit (HCU).

8. If the duplicate mirrored backup fails and at least two contiguous Highway Control Units (HCU) s fail within 30 feet (10 meters) of any vehicle, AHS or Vehicle Control Unit (VCU) notifies Vehicle Operator (VO) s to take manual control of vehicle. If available, driver seat vibration occurs or, if available, vehicle internal beeper sounds a warning. In this situation, proper authorities are notified of any Highway Control Unit (HCU) failure(s).

9. The AHS informs Vehicle Operator (VO) of any traffic congestion along the route identified by other Vehicle Operators (VO) or by the AHS' automated identification thereof to get from point a to point b. The AHS offers alternate routes and specifies time delay involved.

10. Any power failure or other communication failure involving more than 3 contiguous Highway Control Units (HCU) s in length requires the Vehicle Control Unit (VCU) to announce to the Vehicle Operator (VO) that manual control is to be taken by the Vehicle Operator (VO). If technology is available, driver's seat vibrates or internal beeper sounds warning.

11. Control Units Highway (HCU) s have software diagnostic functionality built in to determine any malfunctioning of the system and communicate with maintenance to indicate any abnormalities for remedy thereof.

b. V—Vehicle:

Note: All vehicles equipped with a VCU will have communication with other AV Vehicles in the AHS that are in near proximity (preceding, adjacent to or following) via surrounding HCUs. This communication involves notification to surrounding vehicles as the state that each respective vehicle is in, i.e., its Mode (CNM, CMM or MM with a VCU. If vehicles in MM mode do not have a VCU, then other vehicles having a VCU and surrounding this vehicle will observe through video, radar or sensor detection technology.

1. AM—All Modes:

a. Vehicle Control Unit (VCU) utilizes vehicle's audio speakers, if present, to communicate with Vehicle Operator (VO). If vehicle speakers are not present, Vehicle Control Unit (VCU) speakers are utilized.

b. When AHS messages and notices are received by the Vehicle Control Unit (VCU) their presentation to the Vehicle Operator (VO) over the vehicle's audio speakers overrides anything playing at that time and is be resumed when the AHS announcement is completed.

c. If Vehicle Control Unit (VCU) or Highway Control Unit (HCU) fails, Vehicle Control Unit (VCU) backup speaker-(OEM or after-market) notifies Vehicle Operator (VO) of failure and to take manual control of vehicle.

d. On-board Vehicle Control Unit (VCU) uses on-board detection technology such as video, radar or lidar, if available, that can identify and pinpoint an object in the highway such as a pedestrian, animal or stalled vehicle). If this detection occurs, the car horn activation is initiated, or, car horn activation, breaking and/or swerving applied if in Control Mode (CNM).

e. When a Highway Control Unit (HCU) communicates with a Vehicle Control Unit (VCU), the Highway Control Unit (HCU) is notified if Vehicle Control Unit (VCU) received the communication and assumes system failure if no response.

f. If vehicle crosses over a lane without having turn signal indicator on (in the direction of the move), a beeper signal sounds within the vehicle indicating such. (In Control Mode (CNM), this does not occur since the AHS activates the turn signal.)

g. In communicating with Vehicle Operator (VO) in any of the 3 modes (CNM, CMM and MM), AHS considers the Vehicle Operator's (VO)'s physical state with regard to disabilities and age. It also considers Vehicle Operator (VO) driving history with regard to experience, accidents, DUIs and driving record.

h. In emergency cases, communication with Vehicle Operator (VO) via VOCPN (vehicle operator's cell phone) occurs.

i. Traffic accidents cause manual control to be taken by the Vehicle Operator (VO).

j. Vehicle breakdown such as motor, drive train or other critical parts of the vehicle results in the Vehicle Operator (VO) taking manual control.

K. In cases of an Emergency Vehicle (EV) being an Active Vehicle (AV), if its Emergency Vehicle Active Indicator (EVAI) is "on", in all Modes (Control Mode (CNM), Communication Mode (CMM) and Monitor Mode (MM) the Highway Control Unit (HCU) communicates with all Active Vehicles (AV) in the vicinity of the EV. The EV, through the Highway Control Unit (HCU), can direct traffic lights to turn red or green, depending on EV's requirement for safe traffic flow. If an Active Vehicle (AV) is in Control Mode (CNM), vehicle will automatically pull to the right or left, whichever is appropriate, via Vehicle Control Unit (VCU) command, for safety. In Communication Mode (CMM) or Monitor Mode (MM), Vehicle Operator (VO) should pull to the right or left, whichever is appropriate.

2. CMM—Communication Mode:

a. When AHS is communicating with a Vehicle Operator (VO) under various driving conditions, consideration is given to whether the vehicle is a passenger or commercial vehicle. The reason for this is that commercial Vehicle Operator (VO) s are professional, highly trained drivers and private passenger car vehicles are most likely not professional drivers.

b. When a Vehicle Operator (VO) observes another vehicle operator operating its vehicle erratically or dangerously, the observing Vehicle Operator (VO) has the option to communicate with the Traffic Control Center (TCC) and describe the situation. Traffic Control Center (TCC) acts accordingly.

3. CNM—Control Mode:

a. When in Control Mode, Highway Control Unit (HCU) communicates and controls vehicle movement through vehicle's Vehicle Control Unit (VCU) as defined in Automated Vehicle Control (AVC). The Vehicle Operator has the option to disengage Control Mode (CNM) function at-will by either touching the steering wheel (if this technology is available), putting pressure on the brake or gas pedal (if this technology is available) or audio command. Manually moving the Turn Signal does not disengage Control Mode (CNM), but does communicate to the Highway Control Unit (HCU) the desire to switch lanes when possible. When the vehicle is disengaged from CNM mode by the vehicle operator (VO), the vehicle is automatically reverts to Communication Mode (CMM). Conversely, if the Vehicle Operator (VO) wishes to activate Control Mode (CNM) in the Automated Vehicle Control (AVC), it is accomplished by depressing a button on the steering wheel or dashboard or by audio command, whichever is available.

4. MM—Monitor Mode:

a. When in Monitor Mode (MM), the Highway Control Unit (HCU) monitors (observes) a vehicle through vehicle's Vehicle Control Unit (VCU), if available. If a Vehicle Control Unit (VCU) is not available, then through strategically placed video or radar detection technology in the AHS for Unknown Motorized Vehicles (UMV) or Unknown Non-Motorized Vehicles (UNMV).

C. HV—Highway and Vehicle:

1. As a general rule, audio communication between AHS and the Vehicle Operator (VO) is kept at a minimum so as not to distract the Vehicle Operator (VO). AHS is cognizant of the traffic conditions when communicating with a Vehicle Operator (VO). Minimum communication is critical when traffic is heavy but still moving.

2. The Vehicle Operator (VO) has the option to turn off audio communication with AHS and turn off "Control" mode of AHS, at-will, by touching the steering wheel, putting pressure on the brake or accelerator pedal or by audio command. Conversely, if the Vehicle Operator (VO) wishes to activate Control Mode (CNM) in the Automated Vehicle Control (AVC), they would do so by depressing a button on the steering wheel or dashboard or by audio command, whichever is available.

3. In state of the art Vehicles containing cameras strategically placed about the exterior and or interior of the vehicle, Video technology contained in the vehicle and controlled by AHS is not used by the Vehicle Operator (VO) when the vehicle is in motion, rather they are used in controlling the vehicle's movement while in Control Mode (CNM), if appropriate, and detecting signal light colors, traffic signs, orange cones placed on the highway for caution and other reasons, etc. while in Control Mode (CNM), Monitor Mode (MM) or Communication Mode (CMM). If the vehicle is stationary and the vehicle has video capability that is controlled by AHS, the video is turned on. Once the vehicle begins motion, with the exception of a camera used while backing up a vehicle, the video input from the camera(s) is turned off. The camera(s) are still functioning with regard to the AHS.

4. AHS monitors commercial vehicles within AHS for abnormal delays during the Commercial Vehicle's (CV)

sojourn within AHS. Cargo is matched against Bill Of Lading for the commercial vehicle at checkpoints to search for suspicious material or mismatches against the Bill of Lading.

5. While AHS is monitoring traffic for congestion, it also monitors for traffic accidents. Video validation occurs during such incidences. Videos used for this purpose "turn active" in the Active Vehicle (AV) (or on) when abnormal activity occurs on a highway (e.g. traffic ceases movement, erratic movement of multiple vehicles, etc.). Video technology contained on or within vehicles, Highway Control Units (HCU) s and strategically placed video units on the highway are used. Information on the accidents along with streaming video of the accident is piped to the appropriate Traffic Center Control (TCC) in the legal jurisdiction. Communications with vehicles within a specified vicinity is made to indicate accidents and congestion. The determination of an accident is not only based on video observation, it is also based on an algorithm used by AHS that is a real-time calculation of traffic activity within a specified time period and within a specified number of contiguous Highway Control Units (HCU) s where there is no activity (no traffic movement), which was immediately preceded by abnormal activity of single or multiple lane changes by multiple vehicles, no lane changes but in a particular lane there is no movement but other lanes have traffic movement, etc.

6. Because AHS observes traffic flow and controls traffic movement, AHS has the inherent ability to smooth out traffic congestion and eliminate the problem of "rolling wave" congestion, thereby keeping traffic moving. This "rolling wave" congestion usually occurs after the clearance of traffic accidents, vehicle operation failure, "rubber necking" on the highway, etc.

7. AHS is a multi-lingual environment supporting all the major languages in the world.

8. Priority status is given to emergency vehicles such as Police, Fire Dept., Emergency Medical Services, etc. The manifestation of this "priority status" depends on which jurisdictional authority the vehicle is in, the emergency nature for which the vehicle is on the highway and the condition of the traffic on the highway at the time of the emergency. Emergency Vehicles have direct two-way communication with the jurisdictional Traffic Control Center (TCC) and other emergency entities.

d. PS—Proximity Servers:

1. Proximity Servers are strategically placed throughout the AHS and not only communicate with the Highway Control Unit (HCU) and Vehicle Control Unit (VCU) (via the Highway Control Unit (HCU)) but also communicate with Municipal, County, State, provincial and Federal Regional Transportation Facilities (networks) and Traffic Advisory Services through standard communication protocols.

2. When emergency conditions occur, the Proximity Server (PS) evaluates the problem and notifies other vehicles in the vicinity via the Highway Control Unit (HCU) of the problem and notifies the appropriate jurisdictional authority.

e. AHSN—AHS Network (Private, Secured Access):

1. SAHSI—Shareable AHS Information from AHS to a third party: AHS information is shared amongst authorized entities in the following manner:

a. Time critical and non-time critical information contained within the AHS and deemed shareable with other legal entities such as:

1. Police;
2. Homeland Security;
3. Federal Government, State or provincial Depts. of Transportation;
4. Fire Department's;
5. Medical Facilities;
6. Local, State, Provincial or Federal Government, etc., information is passed to these authorized entities upon request or other authorized process by way of the AHS network. Standard communication protocols are used. Time critical information contained within the AHS and deemed shareable with other legal entities such as:

a. Police;
b. Homeland Security;
c. U.S. or State Departments of Transportation
d. Fire Department's;
e. Medical Facilities;
f. Local, State, Provincial or Federal Governments, etc., information is accessed in a real-time environment (direct access to data in the AHS).

2. SNASHI—Shareable Non-AHS Information from a Third Party to AHS:

a. Non-AHS information from other authorized third party entities is shared with AHS in the following manner:

1. Time Critical and Non time critical information contained in databases external to AHS deemed shareable by other legal entities such as:

a. Police;
b. Homeland Security;
c. U.S. or State Depts. of Transportation
d. Fire Department's;
e. Medical Facilities;
f. Local, State, Provincial or Federal Governments, etc., information is passed from these authorized entities upon request of AHS by way of the AHS network. Standard communication protocols are used.

f. Internet (Public, Secured Access):

1. AHS and all its components is linked to the Internet for access to weather, mapping systems for driving directions and other non-emergency traffic information. Real-time information is gathered from weather, traffic and/or emergency conditions related to highway travel and communicated by request or with all "relevant" vehicles actively operating in the AHS.

3. Security:

In today's automated world, tampering or hacking into computerized systems through either software or hardware (wireless or otherwise) intervention can occur. To protect itself from unauthorized software or hardware intrusion, AHS incorporates state of the art technology to defend itself against such intrusions.

a. Highway:

1. Highway Control Unit (HCU) secured against unauthorized access
2. Internet Access security via Highway Control Unit (HCU).
3. Data encrypted and secured access.

b. Vehicle:

1. Wireless Internet Access security
2. Keys and Driver's License
3. Link Vehicle Operator's (VO)'s cell phone to VID during operation of vehicle.

c. Highway and Vehicle:

1. Any personal data on the Vehicle Operator (VO) stored in any AHS database is encrypted and access to any of this information has granular security access.

2. Traffic Control Centers (TCC) s track commercial vehicles separately and track cargo transfer from one commercial vehicle to another and in multi-model environments.

d. Proximity Servers:

1. Secured firewall access/protection.
2. Data encrypted and secured access.
3. Granulated secured hierarchy access to data on a need to know basis.

4. Interfaces:

a. Communications:

1. 911 and 511 Services-Local, Regional State, provincial and National facilities. (e.g. Arimis System in Ohio and Kentucky).
2. Emergency Medical Services-Local, Regional State and National facilities.

3. Backup/Recovery/Duplication:

AHS incorporates mirrored technology whereby all components including processors, software, communication equipment and data storage is duplicated in real time (mirrored). This process is incorporated into the AHS system to prevent system down time due to hardware, software or power failure. If a physical processor, software or data storage device fails, for whatever reason, the accompanying mirrored device/software would continue the process without interruption. Notification to appropriate authorities would be given by AHS of the failed equipment/software for repair.

FIG. 1 is a diagram of a system 100 for providing highway automation, in accordance with an exemplary embodiment of the present disclosure. System 100 includes highway control unit 102, which is coupled to mirrored proximity server domain 106. Mirrored proximity server domain 106 is coupled to automated highway system 104 and mirrored databases 108, and each of these components can include one or more of the functions described above with respect to these components.

In addition, system 100 includes highway control unit locations 110, which can include separate highway control units or other suitable sensors. Each highway control unit location 110 is used to ensure that accurate data is being generated for the system, such as by including multiple sensors at each on ramp, each off ramp, each lane and so forth. Each vehicle 112 has a vehicle control unit and performs processes as described herein in greater detail, although vehicles lacking a vehicle control unit can be accommodated to the extent disclosed herein.

Figure 2:
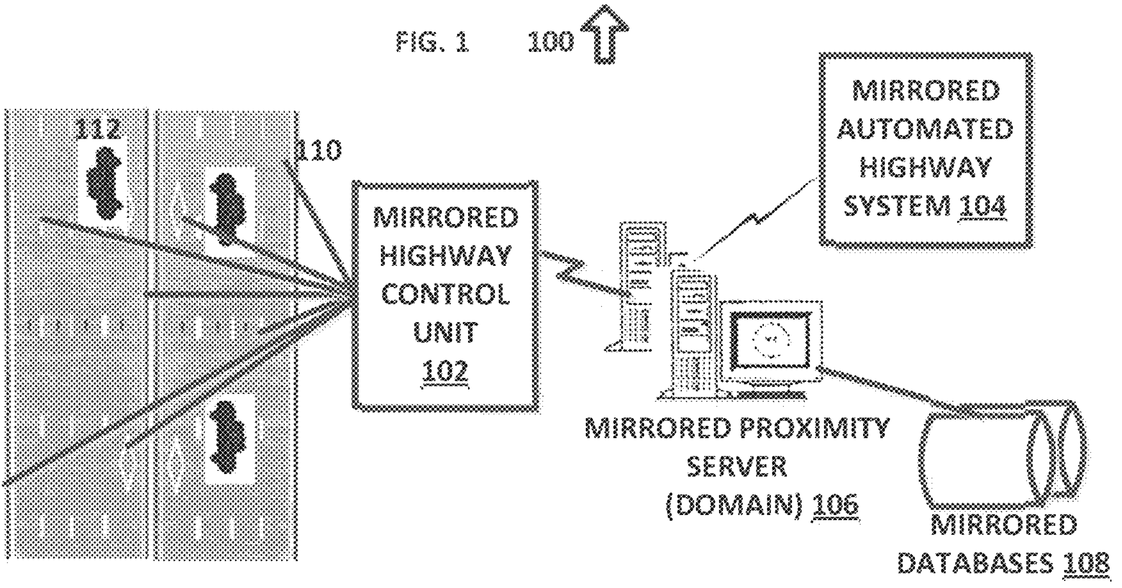
FIG. 2 is a diagram of a system 200 for providing highway automation, in accordance with an exemplary embodiment of the present disclosure.

FIG. 2 is a diagram of a system 200 for providing highway automation, in accordance with an exemplary embodiment of the present disclosure. System 200 displays additional exemplary sensor locations for a straight section of a road. Each vehicle 112 has a vehicle control unit and performs processes as described herein in greater detail.

Figure 3:
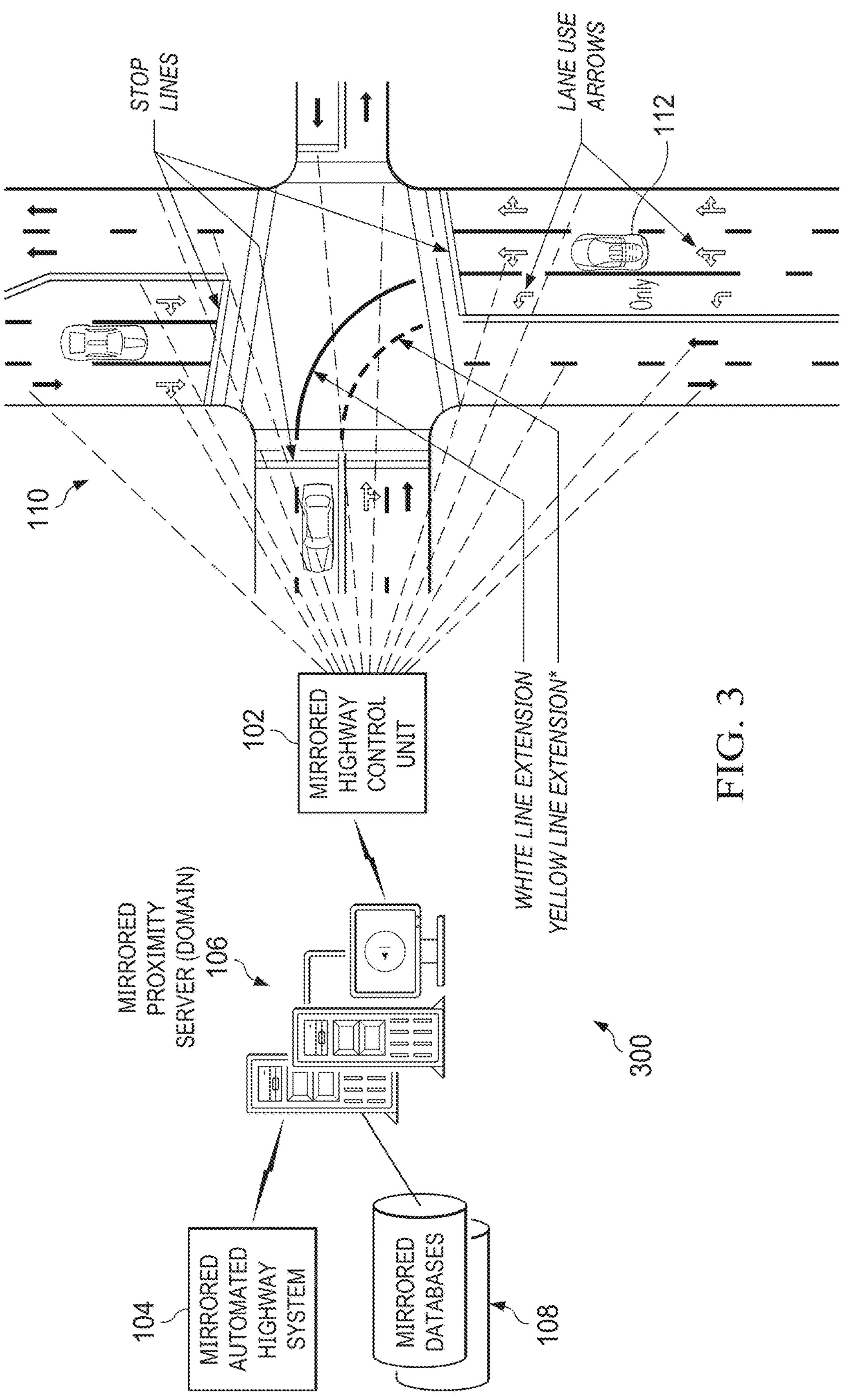
FIG. 3 is a diagram of a system 300 for providing highway automation, in accordance with an exemplary embodiment of the present disclosure.

FIG. 3 is a diagram of a system 300 for providing highway automation, in accordance with an exemplary embodiment of the present disclosure. System 300 displays additional exemplary sensor locations for an intersection. Each vehicle 112 has a vehicle control unit and performs processes as described herein in greater detail.

Figure 4:
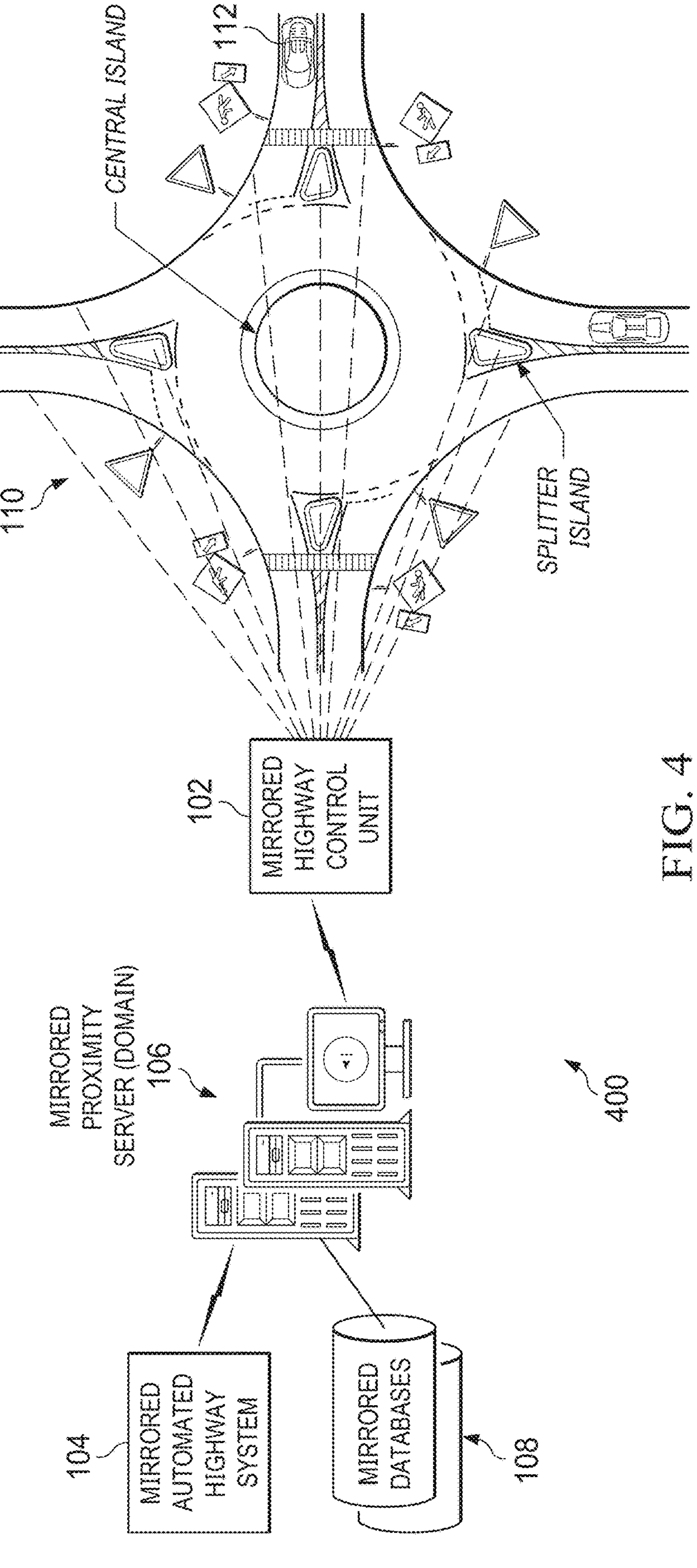
FIG. 4 is a diagram of a system 400 for providing highway automation, in accordance with an exemplary embodiment of the present disclosure.

FIG. 4 is a diagram of a system 400 for providing highway automation, in accordance with an exemplary embodiment of the present disclosure. System 400 displays additional exemplary sensor locations for a traffic circle. Each vehicle 112 has a vehicle control unit and performs processes as described herein in greater detail.

Figure 5:
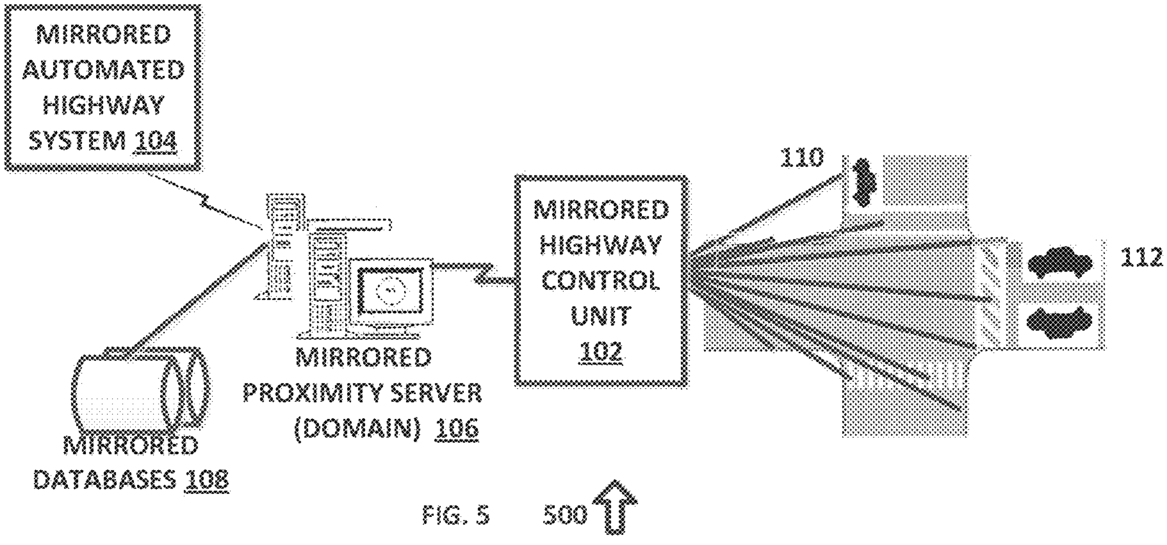
FIG. 5 is a diagram of a system 500 for providing highway automation, in accordance with an exemplary embodiment of the present disclosure.

FIG. 5 is a diagram of a system 500 for providing highway automation, in accordance with an exemplary embodiment of the present disclosure. System 500 displays additional exemplary sensor locations for cross walks. Each vehicle 112 has control units and processes as described herein in greater detail.

Figure 6:
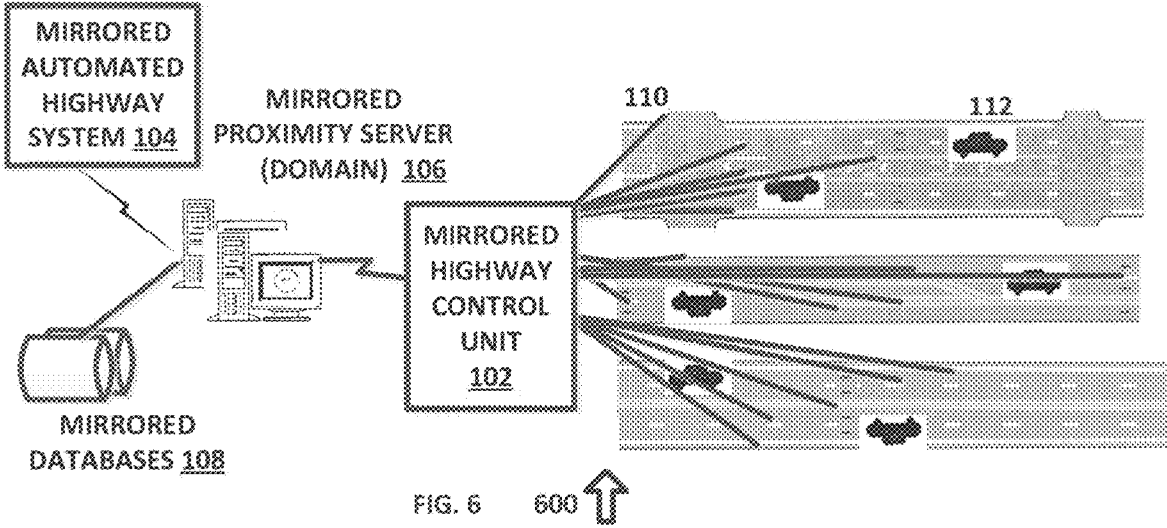
FIG. 6 is a diagram of a system 600 for providing highway automation, in accordance with an exemplary embodiment of the present disclosure.

FIG. 6 is a diagram of a system 600 for providing highway automation, in accordance with an exemplary embodiment of the present disclosure. System 600 displays additional exemplary sensor locations for different road layouts. Each vehicle 112 has a vehicle control unit and performs processes as described herein in greater detail.

It should be emphasized that the above-described embodiments are merely examples of possible implementations. Many variations and modifications can be made to the above-described embodiments without departing from the principles of the present disclosure. All such modifications and variations are intended to be included herein within the scope of this disclosure and protected by the following claims.

What is claimed is:

1. A system for controlling a vehicle, comprising:

a controller disposed in the vehicle and configured to interface with a plurality of highway control units;

the controller configured to receive data from a proximity server coupled to each of the highway control units;

the controller configured to receive data from an automated highway control system coupled to the proximity server and configured to interactively communicate with each of the highway control units through the proximity server; and the controller configured to receive data from a database coupled to the proximity server and configured to receive and store data from each of the highway control units.

2. The system of claim 1 further comprising a plurality of vehicles configured to interactively communicate with the plurality of highway control units, each of the vehicles further comprising a control system configured to receive control data from each of the highway control units and to adjust one or more operational variable in response to the control data.

3. The system of claim 1 wherein the control system of each vehicle is configured to provide response data to the highway control units in response to the control data.

4. The system of claim 1 wherein each highway control unit is disposed at an on ramp of a controlled highway.

5. The system of claim 1 wherein each highway control unit is disposed at an off ramp of a controlled highway.

6. The system of claim 1 wherein each highway control unit is disposed at a lane marker of a controlled highway.

7. The system of claim 1 wherein each highway control unit is disposed at a high occupancy vehicle marker of a controlled highway.

8. The system of claim 1 wherein each highway control unit is disposed at a stop marker of a controlled intersection.

9. The system of claim 1 wherein each highway control unit is disposed at a lane use marker of a controlled intersection.

10. The system of claim 1 wherein each highway control unit is disposed at a cross walk marker of a controlled intersection.

11. A method for controlling a vehicle, comprising:

using a vehicle controller to interface with a plurality of highway control units;

the vehicle controller configured to receive data from a proximity server coupled to each of the highway control units;

the vehicle controller configured to receive data from an automated highway control system coupled to the proximity server and configured to interactively communicate with each of the highway control units through the proximity server; and the vehicle controller configured to receive data from a database coupled to the proximity server and configured to receive and store data from each of the highway control units.

12. The method of claim 11 further comprising providing a control system to each of a plurality of vehicles, wherein the control system of each vehicle is configured to receive control data from each of the highway control units and to adjust one or more operational variable in response to the control data.

13. The method of claim 11 further comprising configuring the control system of each vehicle to provide response data to the highway control units in response to the control data.

14. The method of claim 11 further comprising disposing each highway control at an on ramp of a controlled highway.

15. The method of claim 11 further comprising disposing each highway control unit at an off ramp of a controlled highway.

16. The method of claim 11 further comprising disposing each highway control unit at a lane marker of a controlled highway.

17. The method of claim 11 further comprising disposing each highway control unit at a high occupancy vehicle marker of a controlled highway.

18. The method of claim 11 further comprising disposing each highway control unit at a stop marker of a controlled intersection.

19. The method of claim 11 further comprising disposing each highway control unit at a lane use marker of a controlled intersection.

20. The method of claim 11 further comprising disposing each highway control unit at a cross walk marker of a controlled intersection.

* * * * *